(No Model.)
C. R. EVERSON.
MANUFACTURE OF EAVES TROUGHS.
No. 268,472.　　　　　　　Patented Dec. 5, 1882.
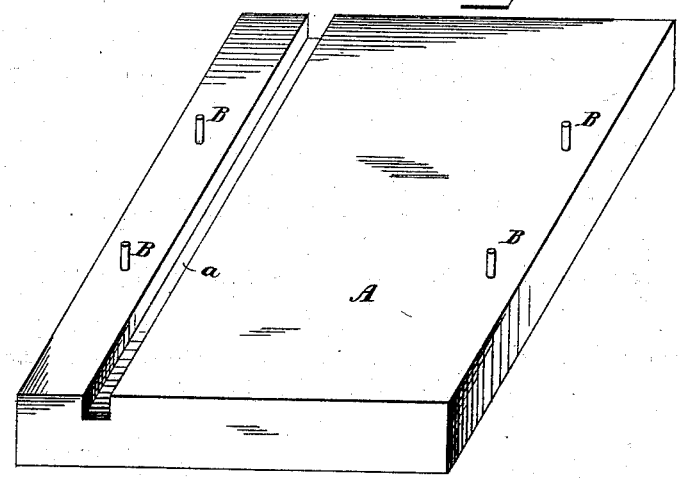
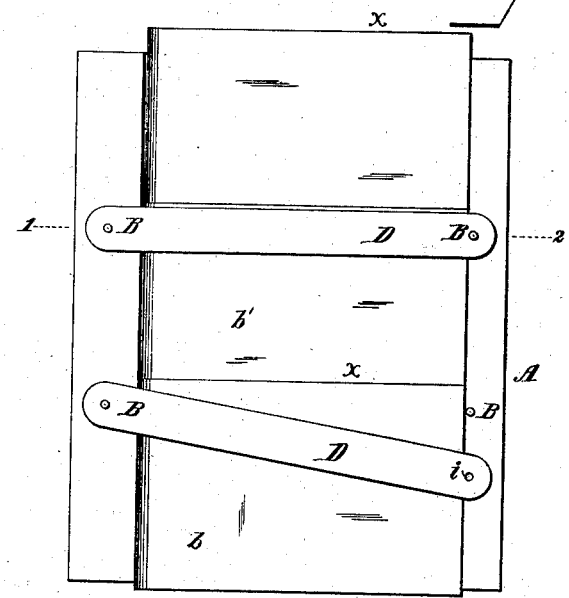
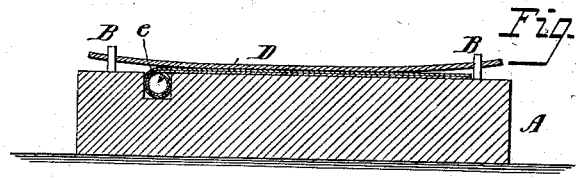
Attest:
Courtney A. Cooper
William Paxton
Inventor:
C. R. Everson
By his attorney
Charles E. Foster

UNITED STATES PATENT OFFICE.

CHARLES R. EVERSON, OF MACEDON, NEW YORK.

MANUFACTURE OF EAVES-TROUGHS.

SPECIFICATION forming part of Letters Patent No. 268,472, dated December 5, 1882.

Application filed May 15, 1882. (No model.)

*To all whom it may concern:*

Be it known that I, CHARLES R. EVERSON, a citizen of the United States, and a resident of Macedon, Wayne county, New York, have invented certain new and useful Improvements in the Manufacture of Eaves-Troughs, of which the following is a specification.

My invention is a device, constructed as fully described hereinafter, to facilitate the uniting of sheets of ribbed or flanged metal in the manufacture of eaves-troughs, &c.; and it consists of a board or block having a groove near one edge, and projecting pins and strips supported by said pins for holding down the edge of one sheet upon the sheet to which it is to be united.

In the drawings, Figure 1 is a perspective view of the base board or block. Fig. 2 is a plan showing the base-board and strips with sheets of ribbed tin as arranged for soldering; and Fig. 3 is a cross-section on the line 1 2, Fig. 2.

A is a board or block having near one edge a groove, $a$, deep enough to receive the ribs $e$ at the edges of plates $b\ b'$, which are to be soldered together along the edge $x$. From the base-block project vertical pins B, arranged near the opposite edges of the base, those on one edge being directly opposite those upon the opposite edge, and strips or cross-pieces D, of iron or other material, have near the ends perforations $i$, adapted to receive said pins, the distance between the perforations in each strip being slightly greater than that between the pins B, to which the strip is applied.

The plates or sheets $b\ b'$ to be soldered together are placed with their ribs or flanges $e$ in the groove $a$, with the edge of one plate slightly overlapping that of the next adjacent to the line upon which the pins B are arranged. The cross-strips D are bent slightly downward in the centers, and are applied to the pins as shown in Fig. 3, which pins pass through the holes in the ends of the strips and hold them in the curved position shown, inasmuch as the strips cannot bend upward in the centers without spreading the pins apart. By this simple means the strips are held securely in place in tight contact with the plate below, pressing the latter upon the plate beneath, so that the edges are held in close contact while the solder is applied along the edge $x$. The device thus constructed is readily made and much cheaper than the complicated devices ordinarily used.

I claim—

A device for facilitating the soldering of plates, consisting of a base, A, provided with pins B B, and having a side groove, $a$, and cross-strips D, perforated and adapted to be retained by the pins, substantially as set forth.

In testimony whereof I have signed my name to this specification in the presence of two subscribing witnesses.

CHAS. R. EVERSON.

Witnesses:
J. H. TRUAX,
MARTIN DEAN.